United States Patent [19]
Inou et al.

[11] Patent Number: 5,905,527
[45] Date of Patent: *May 18, 1999

[54] MOVEMENT VECTOR DETECTION APPARATUS AND IMAGE PROCESSOR USING THE DETECTION APPARATUS

[75] Inventors: Kazuya Inou, Tokyo; Kitahiro Kaneda, Yokohama, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/566,658

[22] Filed: Dec. 4, 1995

Related U.S. Application Data

[63] Continuation of application No. 08/166,950, Dec. 15, 1993, abandoned.

[30] Foreign Application Priority Data

Dec. 28, 1992 [JP] Japan .................................... 4-360133

[51] Int. Cl.$^6$ .................................................. H04N 5/228
[52] U.S. Cl. ............................................ 348/208; 348/155
[58] Field of Search ...................... 348/208, 413, 348/416, 699, 700, 452, 155; H04N 5/228

[56] References Cited

U.S. PATENT DOCUMENTS

| | | | |
|---|---|---|---|
| 5,019,901 | 5/1991 | Uomori et al. | 348/699 |
| 5,025,495 | 6/1991 | Avis | 348/452 |
| 5,189,513 | 2/1993 | Sekine et al. | 348/208 |
| 5,585,843 | 12/1996 | Ishizuka et al. | 348/208 |

OTHER PUBLICATIONS

An Adaptive Motion Decision System for Digital Image Stabilizer Based on Edge Pattern Matching–Park et al., IEEE Transaction on Consumer Electronics, vol. 38, No. 3–Aug. 1992. (Manuscript Received Jun. 5, 1992).

Automatic Image Stabalizing System by Full–Digital Signal Processing Uomori et al.–IEEE Trans. on Consumer Elect., vol. 36, No. 3–Aug. 1990.

*Primary Examiner*—Tuan Ho
*Attorney, Agent, or Firm*—Fitzpatrick, Cella, Harper & Scinto

[57] ABSTRACT

A movement vector detection apparatus having a binary coding section for converting an input image signal into a two-value signal, a calculation section for calculating a correlation between images by using the two-value signal output from the binary coding section, a detection section for detecting a movement vector by using correlation values calculated by the calculation section, an evaluation section for evaluating a plurality of movement vectors detected by the detection section on the basis of correlation values calculated by the calculation section, and a determination section for determining a particular movement vector from the plurality of movement vectors evaluated by the evaluation section. Also, an image processor having an input section for inputting an image signal, a memory section for storing the image signal, a separation section for separating a luminance signal from the image signal, a binary coding section for converting the luminance signal separated by the separation section into a two-value signal, an image shake detection section for detecting a shake of the input image signal by using the two-value signal output from the binary coding section, and a read section for reading an image from the memory section according to an output from the image shake detection section.

16 Claims, 11 Drawing Sheets

ENLARGED PICTURE
(ORDINARY SIZE)

MOVEMENT VECTOR DETECTION APPARATUS AND IMAGE PROCESSOR USING THE DETECTION APPARATUS

This application is a continuation of application Ser. No. 08/166,950 filed Dec. 15, 1993, abandoned.

BACKGROUND OF THE INVENTION

1. Field of the Invention

This invention relates generally to image processors and, more particularly, to an image processor capable of correcting shaking of an image.

2. Description of the Related Art

A correlation method based on correlation calculation and a block matching method are known for use as a movement vector detection method that is necessary for an image coding apparatus or an apparatus for correcting image shaking (movement).

In a block matching method, an input image signal is divided with respect to a plurality of blocks of a suitable size (e.g., 8 pixels×8 lines), differences from pixels in a certain area of the preceding field (or frame) are calculated with respect to each block, and a block in the preceding field for which the sum of absolute values of the differences is at a minimum is searched for. The relative shift between the related blocks is expressed as a movement vector.

A conventional image shaking correction apparatus which detects a movement vector of an image by using the block matching method and corrects shaking of the image by using the movement vector will be described below with reference to the drawings.

Figure 1:
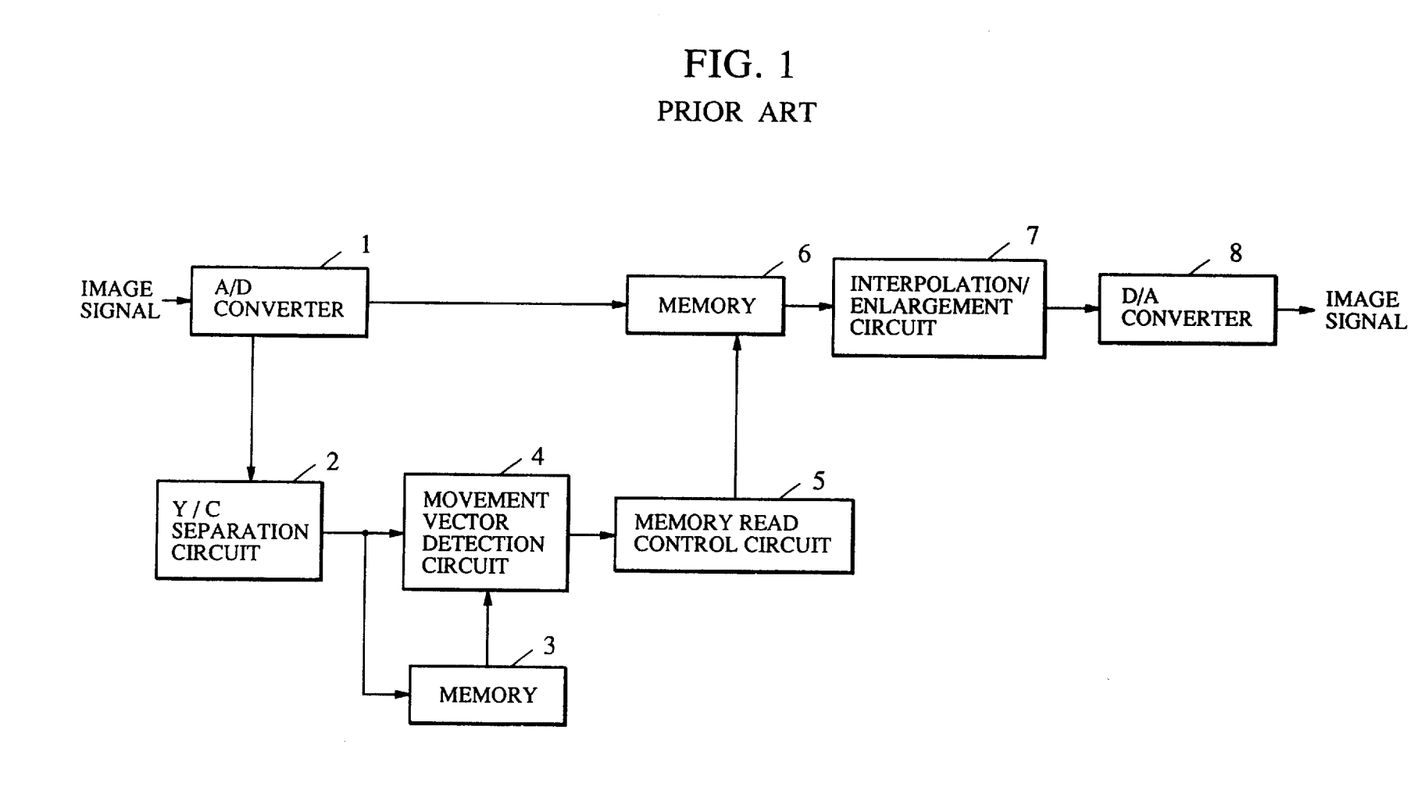
FIG. 1 is a block diagram of a conventional image shaking correction apparatus.

FIG. 1 is a block diagram of a conventional image shaking correction apparatus.

A block 1 represents an A/D converter for converting an input analog image signal into a digital signal.

A block 2 represents a Y/C separation circuit for extracting only a Y (luminance) signal from the digital signal converted from the input image signal.

A block 3 represents a memory for storing the Y signal output from the Y/C separation circuit 2.

A block 4 represents a movement vector detection circuit 4 for detecting the amount of movement of a vector by comparing the Y signal of a preceding frame stored in the memory and the Y signal of the present frame output from the Y/C separation circuit 2.

A block 5 represents a memory read control circuit for determining an image portion to be read from an image stored in the memory 3 by receiving movement vector information from the movement vector detection circuit 4.

A block 6 represents a memory for storing an output signal from the A/D converter 1.

A block 7 represents an interpolation/enlargement circuit for interpolation and enlargement processing of an image signal obtained by reading a portion of the picture stored in the memory 6. Through the circuit 7, an image signal presenting an image enlarged to a predetermined picture size is output.

A block 8 represents a D/A converter for converting a digital signal into an analog signal.

In the conventional image shaking correction apparatus arranged as described above, an image signal representing a shaking image is converted into a digital signal by the A/D converter 1 and distributed to two lines.

Through one of these lines, the digital signal is sent to the Y/C separation circuit 2, and only the Y signal is extracted and input to the memory 3 and the movement vector detection circuit 4.

In the movement vector detection circuit 4, a movement vector is detected by comparing signal data of the present and preceding fields with respect to each of a plurality of blocks in accordance with the block matching method. More specifically, a correlation between the present and preceding fields is calculated with respect to each block, and a block of the preceding field at which the result of correlation calculation, i.e., a correlation value, is at a minimum is searched for. The relative shift of the block thereby found is set as a movement vector.

On the basis of the detected movement vector detected by the movement vector detection circuit 4, the memory read control circuit 5 changes addresses at which the image signal stored in the memory is read out, thereby changing the image position.

Figure 2:
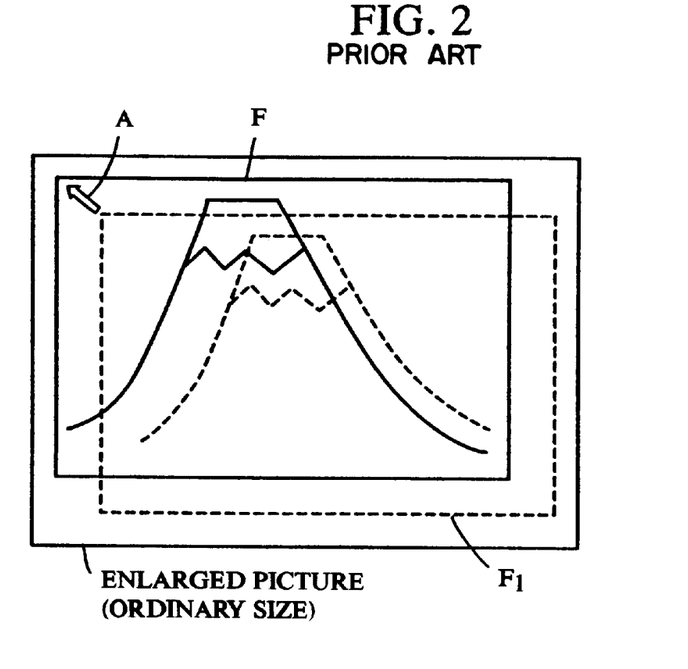
FIG. 2 is a diagram of a method of reading out image information of a shaking image stored in a memory while correcting image shaking in the image information.

The operation of this apparatus will be described in more detail with reference to FIG. 2. Certain frames of an input image, such as frames F1, F2 . . . shown in FIG. 2, are extracted. One of such frames has been translated in an entire picture on the basis of a movement vector A so that shaking of the picture is cancelled out. The position of the extracted frame is shifted by changing the read addresses.

In this case, it is necessary to enlarge the size of the image output from the memory 6, since image shaking correction is performed by extracting certain frames within the normal picture size. Therefore, the image output from the memory 6 undergoes interpolation/enlargement processing in the interpolation/enlargement circuit 7.

The image signal processed for interpolation/enlargement is converted into an analog signal by the D/A converter circuit 8 before it is output.

The conventional movement vector detection processing is performed in the above-described manner. However, it is natural that when a movement vector is detected by the movement vector detection means with respect to each block, the detected movement vector depends largely upon the image state (pattern) of blocks as processing objects.

The influence of image patterns will be described with reference to the drawings.

Figure 3:
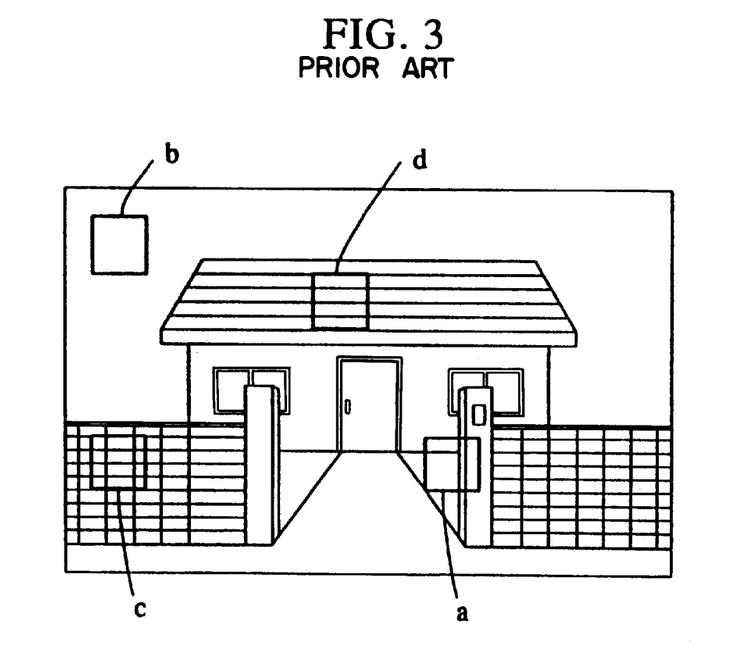
FIG. 3 is a diagram of an ordinary image.

FIG. 3 shows an ordinary image. FIGS. 4(a) through 4(d) are graphs of variations in correlation values depending upon image states (patterns).

Figures 4A, 4B, 4C, 4D:
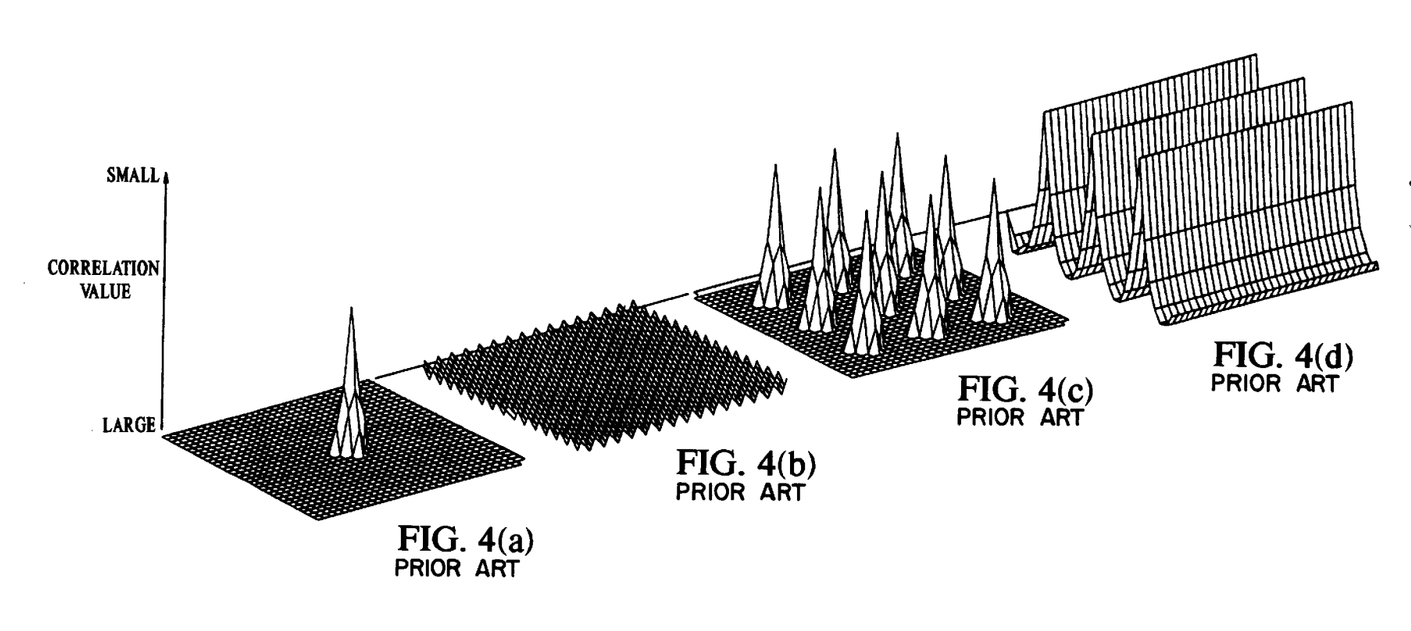
FIGS. 4(a) through 4(d) are graphs of variations in correlation values when block matching is performed by extracting portions having different patterns as blocks from the image shown in FIG. 3.

It can be understood that if the above-described block matching is performed with respect to an ordinary image pattern, e.g., a portion a shown in FIG. 3, a strong correlation is exhibited at one point by correlation calculation, as shown in FIG. 4(a), and that a movement vector can be detected with high reliability in such a case.

However, if block matching is performed with respect to a portion b shown in FIG. 3 (e.g., a low-contrast pattern, such as an image of a sky or a white wall), a sufficiently strong correlation cannot be obtained by correlation calculation, as shown in FIG. 4(b), and there is a possibility that a movement vector with a large error will be detected.

Similarly, if block matching is performed with respect to a portion c shown in FIG. 3 (e.g., a reiterative pattern, such as an image of a brick wall or a wire net, consisting of congruent figures), a strong correlation is exhibited at a plurality of points by correlation calculation, as shown in FIG. 4(c), and there is a possibility that a movement vector with a large error will be detected.

Further, if block matching is performed with respect to a portion d shown in FIG. 3 (e.g., an image pattern of a roof or blind slats having a strong correlation in one direction but substantially no correlation in other directions), a strong correlation is exhibited at a plurality of points by correlation calculation, as shown in FIG. 4(d), and there is also a possibility that a movement vector with a large error will be detected.

SUMMARY OF THE INVENTION

In view of these circumstances, an object of the present invention is to provide a movement vector detection apparatus having high movement vector detection accuracy with respect to any picture pattern and an image processor using the movement vector detection apparatus.

To achieve this object, according to one aspect of the present invention, there is provided a movement vector detection apparatus comprising binary coding means for converting an input image signal corresponding to a current image into a two-value signal, calculation means for calculating a correlation between the current image and a previous image by using the two-value signal output from the binary coding means, detection means for detecting a movement vector by using correlation values calculated by the calculation means, evaluation means for evaluating a plurality of movement vectors detected by the detection means on the basis of correlation values calculated by the calculation means, and determination means for determining a particular movement vector from the plurality of movement vectors evaluated by the evaluation means.

According to another aspect of the present invention, there is provided an image processor comprising input means for inputting an image signal, memory means for storing the image signal, separation means for separating a luminance signal from the image signal, binary coding means for converting the luminance signal separated by the separation means into a two-value signal, image shaking detection means for detecting shaking of the input image signal by using the two-value signal output from the binary coding means, and read means for reading an image from the memory means according to an output from the image shaking detection means.

Yet another aspect of the present invention provides a movement vector detecting apparatus including calculation means for calculating a correlation between image signals and detection means for detecting a movement vector by using correlation values calculated by the calculation means. Evaluation means is provided for evaluating a plurality of movement vectors detected by the detection means on the basis of correlation values calculated by the calculation means. The evaluation means evaluates the reliability of each of the movement vectors detected by the detection means on the basis of the ratio of the difference between an average value and a minimum value in the corresponding correlation values to the difference between a maximum value and the minimum value in the corresponding correlation values. Determination means is provided for determining a particular movement vector from the plurality of movement vectors evaluated by the evaluation means.

Still another aspect of the present invention provides a movement vector detection apparatus including calculation means for calculating a correlation between image signals and detection means for detecting a movement vector by using correlation values calculated by the calculation means. Evaluation means is provided for evaluating a plurality of movement vectors detected by the detection means on the basis of correlation values calculated by the calculation means. The evaluation means evaluates the reliability of each of the movement vectors detected by the detection means on the basis of the maximum of the corresponding correlation values. Determination means is provided for determining a particular movement vector from the plurality of movement vectors evaluated by the evaluation means.

Another aspect of the present invention provides a movement vector detection apparatus for determining a whole-picture movement vector for a current frame having a plurality of blocks relative to a previous frame having a plurality of blocks. The apparatus includes binary coding means for converting an input image signal corresponding to the current frame into a two-value signal and calculation means for calculating a correlation between a block of the current frame and a block of the previous frame by using the two-value signal output from the binary coding means. The apparatus further includes detection means for detecting a block movement vector by using correlation values calculated by the calculation means and evaluation means for evaluating a plurality of block movement vectors detected by the detection means on the basis of correlation values calculated by the calculation means. Determination means is provided for determining a whole-picture movement vector based on the plurality of block movement vectors evaluated by the evaluation means.

Still another aspect of the present invention provides a method for detecting a movement vector for a current image. An input image signal corresponding to the current image is converted into a two-value signal. A correlation between the current image and a previous image is then calculated using the two-value signal. A movement vector is detected using calculated correlation values. A plurality of detected movement vectors are then evaluated on the basis of the calculated correlation values. On the basis of the plurality of evaluated movement vectors, a particular movement vector is determined.

These and other objects, advantages and features of the invention will become apparent from the following detailed description of preferred embodiments of the invention taken in conjunction with the accompanying drawings.

DESCRIPTION OF THE PREFERRED EMBODIMENTS

An image processor in accordance with embodiments of the present invention will be described below.

Figure 5:
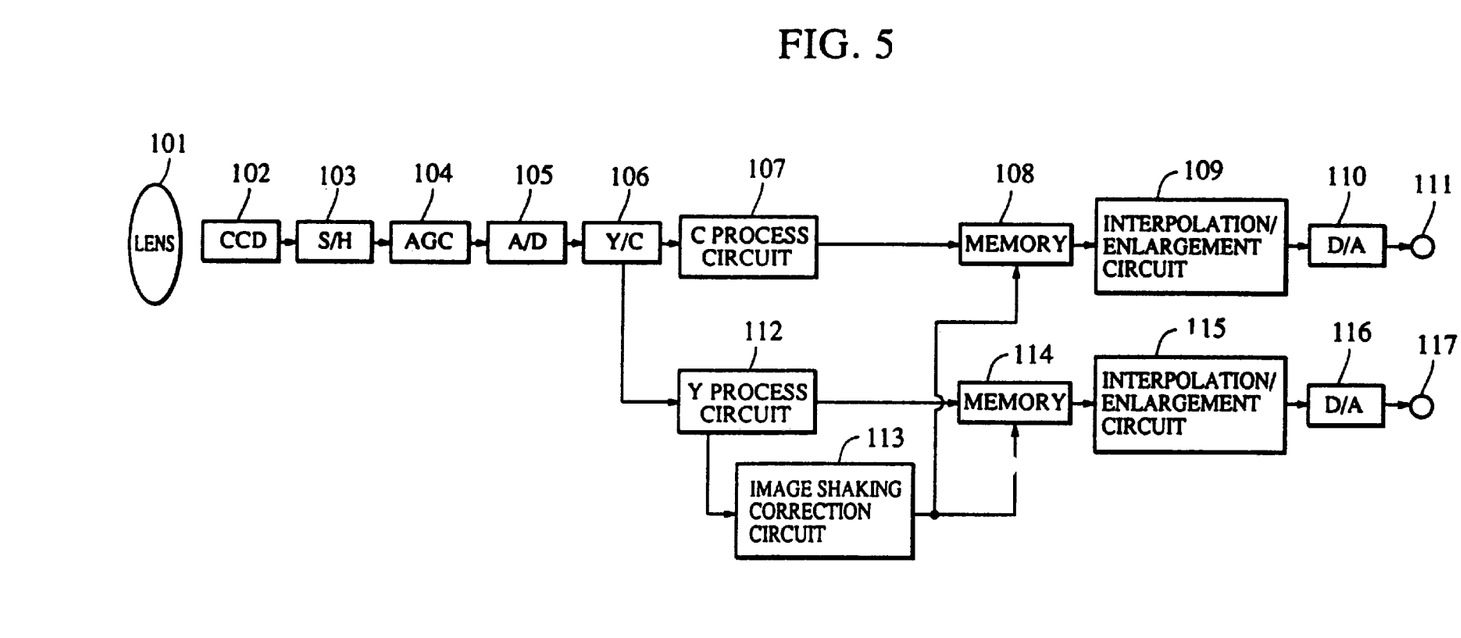
FIG. 5 is a block diagram of an image processor in accordance with embodiments of the present invention.

Referring to FIG. 5, which is a block diagram of an image processor in accordance with the present invention, an input image that is imaged by an image pickup lens 101 is converted into an electrical signal by an image pickup device (e.g., a charge coupled device (CCD)) 102.

An output from the CCD 102 is output to an automatic gain control (AGC) circuit 104 through a sample and hold circuit (S/H) 103.

An output from the AGC circuit 104 is converted into a digital signal by an A/D converter 105.

A Y/C separation circuit 106 is formed of two 1H delay lines and an adder for adding an input and a 2H delay signal. An output from the adder is output to a C process circuit 107, which is a color signal processing circuit. A 1H delay signal is output to a Y process circuit 112, which is a luminance signal processing circuit.

The C process circuit 107 forms a chroma signal from the output from the Y/C separation circuit 106. An output from the C process circuit 107 is temporarily stored in a memory 108.

The Y process circuit 112 performs edge emphasis and gamma correction of the output from the Y/C separation circuit. An output signal from the Y process circuit 112 is output to a memory 114 and to an image shaking correction circuit 113.

The image shaking correction circuit 113 detects a movement from the input luminance signal and controls memory read positions so that the corresponding image shake is corrected. Details of the configuration and the processing operation of the image shaking correction circuit 113 will be described below.

The chroma signal and the luminance signal read out from the memories 108 and 114 after image shaking correction are processed in interpolation/enlargement circuits 109 and 115 for enlargement to an ordinary size as in the case of the conventional apparatus described above. D/A converters 110 and 116 respectively convert the processed signals into analog signals, which are output through output terminals 111 and 117.

The configuration and the operation of the image shaking correction circuit 113 shown in FIG. 5 will now be described.

Figure 6:
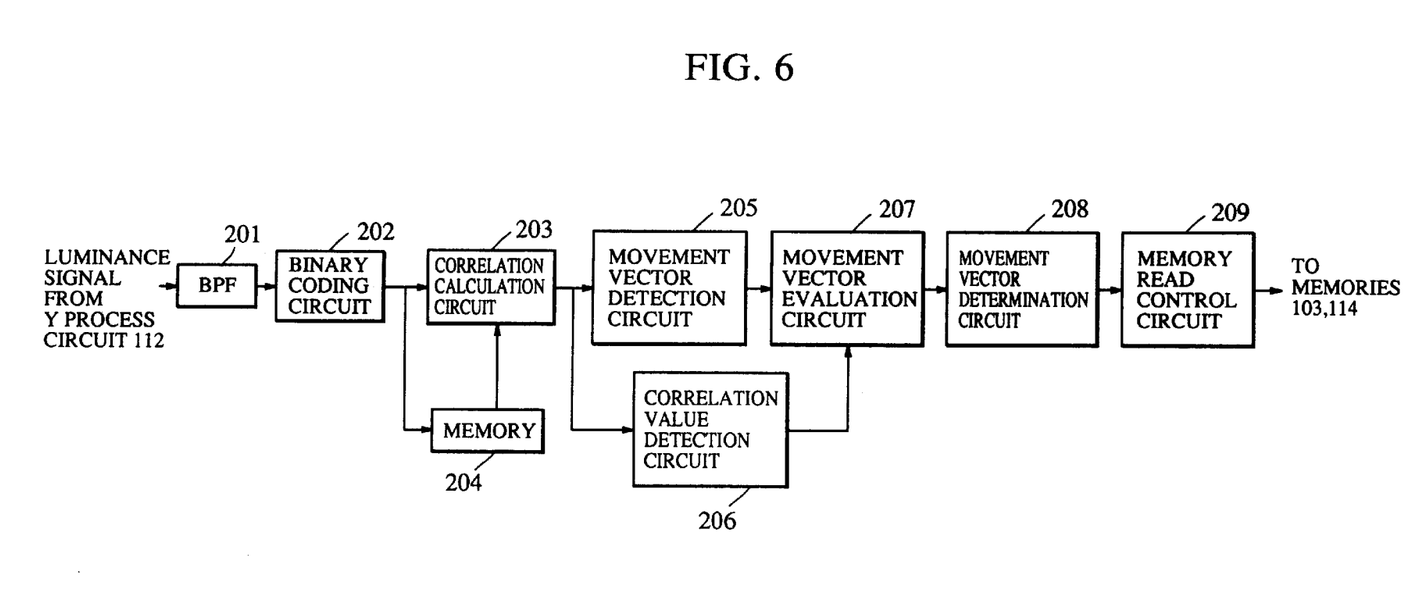
FIG. 6 is a block diagram of image shaking correction circuit 113 shown in FIG. 5.

Referring to FIG. 6, which is a block diagram of the image shaking correction circuit 113, a band-pass filter (BPF) 201 is a spatial frequency filter for extracting spatial frequency components utilized for movement vector detection from the input luminance signal. More specifically, low spatial frequency components and high spatial frequency components of the image signal are removed.

The reason for removing such frequency components is that many extreme values may appear in correlation values if spatial frequencies in an image are extremely high, and no extreme value appears if spatial frequencies are extremely low, and, in either case, the amount of movement cannot be detected correctly.

An output from the BPF 201 is input to a binary coding circuit 202, in which the image signal is converted into a two-value signal about zero level. More specifically, code bits of the signal are output.

The amount of data can be remarkably reduced by the binary coding circuit 202, so that a matching calculation at a rear stage is much easier than calculation of a multi-value image and the circuit can be remarkably simplified.

The arrangement using the BPF 201 and the binary coding circuit 202 is also advantageous for the following reason. If an input signal that does not pass through a BPF is converted into a two-value signal with a fixed threshold, the binary pattern is changed by a change in illumination intensity and there is a possibility of failure to correctly evaluate the pattern. If the input signal is passed through the BPF 201 to cut its DC components, the phase at zero level is not changed by a change in illumination intensity, although the amplitude is changed. By binary coding with a threshold at zero level, therefore, an image movement can be correctly obtained without being influenced by a change in illumination intensity.

Also, if the image after passage through the BPF is converted into a two-value signal, the ratio of two values (white:black) is approximately 1:1 and an average value of a correlation as a matching result is substantially constant. If the average is constant, a circuit for obtaining the average can be reduced and the average value can be utilized for the later-described movement vector evaluation with high reliability.

The two-value image signal obtained by the binary coding circuit 202 is input to a correlation calculation circuit 203 and to a memory 204 provided as a one-field delay means.

The image signal one field before the present signal is also input to the correlation calculation circuit 203.

The correlation calculation circuit 203 divides one picture into n blocks (n: an integer equal to or greater than 2), calculates a correlation between the present field and the preceding field with respect to each block, and outputs the result of this calculation to a movement vector detection circuit 205 and a correlation value detection circuit 206. For example, a picture is divided as shown in FIG. 3.

In more detail, the preceding field is searched for a block having a correlation with a block presently processed. That is, because a plurality of blocks in the preceding field are searched, a plurality of correlation values are output from the correlation calculation circuit 203.

The movement vector detection circuit 205 detects movement vectors with respect to the blocks from the correlation values from the correlation calculation circuit 203. In more detail, the movement vector detection circuit 205 searches for the block in the preceding field having the minimum of the plurality of input correlation values, detects a relative shift between the block thereby found and the presently-processed block, calculates a movement vector on the basis of this shift, and outputs the movement vector to a movement vector evaluation circuit 207.

On the other hand, the correlation value detection circuit 206 detects or calculates a predetermined value from the plurality of correlation values calculated by the correlation calculation circuit 203, and outputs the detection result to the movement vector evaluation circuit 207.

The movement vector evaluation circuit 207 evaluates the movement vector of each block on the basis of the output from the correlation value detection circuit 206. The method of this evaluation will be described below.

The evaluated movement vector is output to a movement vector determination circuit 208. The movement vector determination circuit 208 determines a whole-picture movement vector (for one picture) from the input movement vectors of the n blocks.

More specifically, the movement vector determination circuit 208 sets a medium or average value of the input movement vectors of the n blocks as a whole-picture movement vector.

The movement vector determination circuit 208 outputs the whole-picture movement vector to a memory read control circuit 209.

The memory read control circuit 209 controls image read positions in the memories 108 and 114 (see FIG. 5) according to the whole-picture movement vector so that the movement of the image is cancelled out. Image signals corrected with respect to the image shake are output from the memories 108 and 114.

A movement vector evaluation method in accordance with the first embodiment will be described below.

The correlation value detection circuit 206 of the first embodiment detects the minimum of a plurality of correlation values calculated by the correlation calculation circuit 203.

Figure 7:
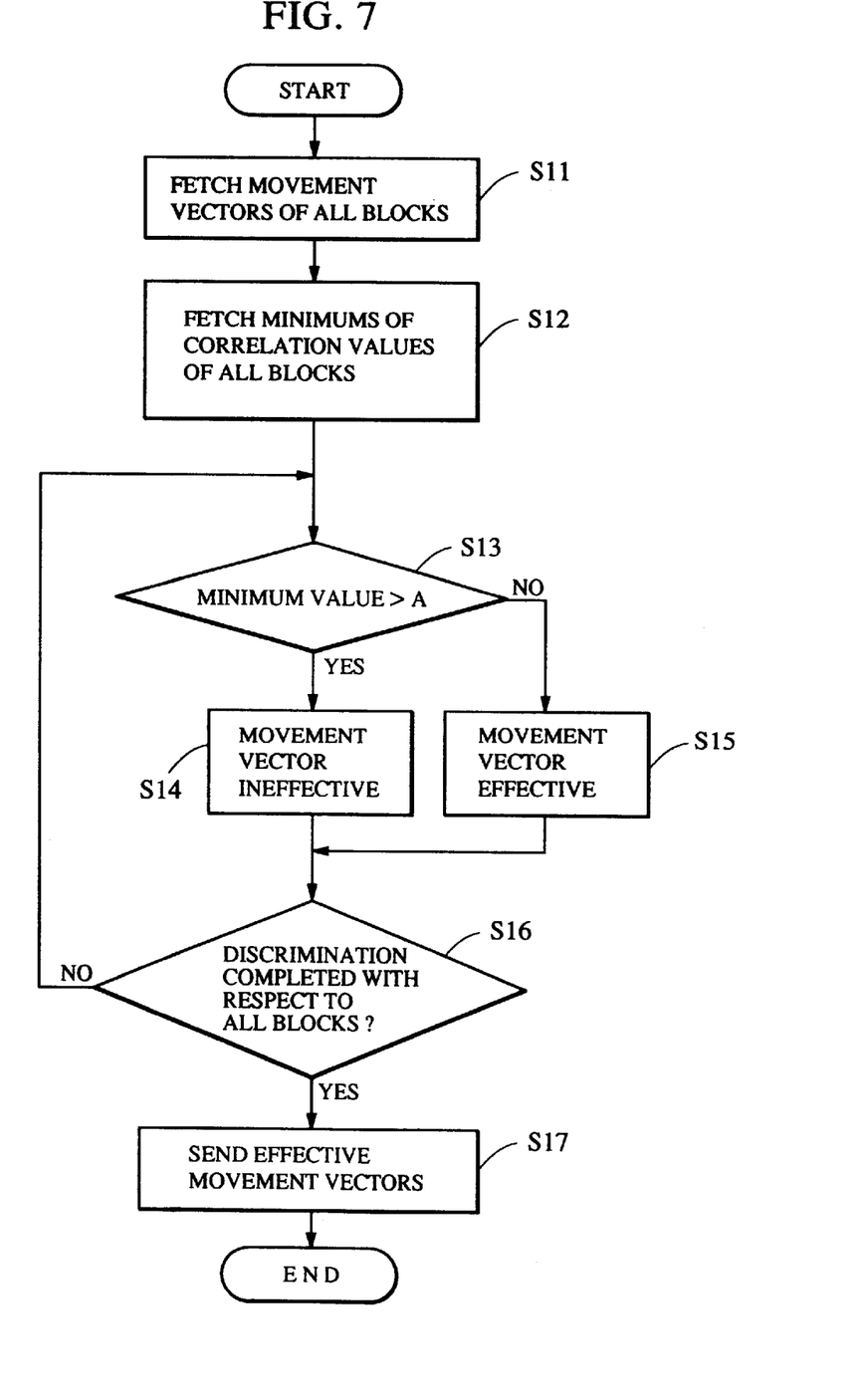
FIG. 7 is a flowchart of processing in movement vector evaluation circuit 207 in accordance with a first embodiment of the present invention.

FIG. 7 is a flowchart of the processing in the movement vector evaluation circuit 207 of the first embodiment.

First, in step S11, all the movement vectors of the blocks are received from the movement vector detection circuit 205.

In step S12, the minimum of the correlation values of each block output from the correlation value detection circuit 206 is received with respect to all the blocks.

In step S13, the minimum value of each block is compared with a threshold value A previously determined.

When a conditional equation:

Minimum value>A is satisfied, the process proceeds to step S14 to recognize the movement vector of the corresponding block as an ineffective vector.

When the conditional equation is not satisfied, the process proceeds to step S15 to recognize the movement vector of the corresponding block as an effective vector.

In step S16, a determination is made as to whether the discrimination has been completed with respect to all the blocks. If the discrimination has not been completed, the process returns to step S13. When the discrimination has been completed with respect to all the blocks, the process proceeds to step S17 and all the effective movement vectors discriminated with respect to the blocks in the above-described manner are output to the movement vector determination circuit 208. The movement vector evaluation processing is thereby terminated.

The effect of the evaluation method of the first embodiment will be described with reference to FIGS. 8(a) through 8(d).

FIGS. 8(a) through 8(d) are graphs showing variations in correlation values output from the correlation calculation circuit 203, and correspond to the patterns of FIGS. 3(a) through 3(c).

Figure 8A:
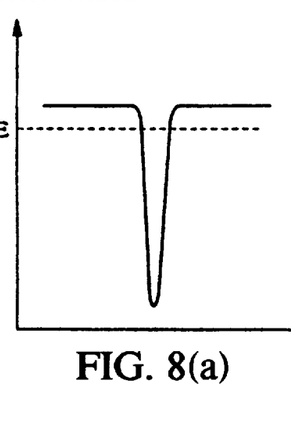
FIGS. 8(a) through 8(d) are graphs of variations in correlation values output from correlation calculation circuit 203.
Figure 8B:
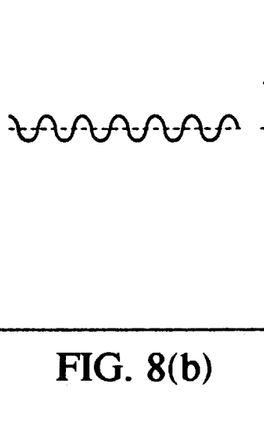
Figure 8C:
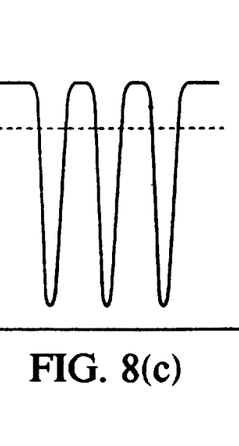
Figure 8D:
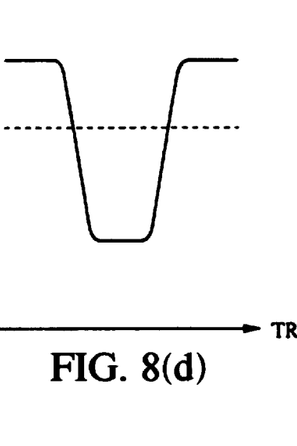

FIG. 8(a) is a graph showing correlation values in the case of an image in which a distinct feature is seen, i.e., ideal correlation values for detecting a movement vector. FIG. 8(b) is a graph showing correlation values in the case of an image having only weak features. FIG. 8(c) is a graph showing correlation values in the case of an image having a plurality of similar features. FIG. 8(d) is a graph showing correlation values in the case of an image having a strong correlation in a particular direction.

Specifically, the minimum of the correlation values shown in FIG. 8(b) is smaller than that of the values shown in FIG. 8(a).

That is, blocks having a correlation such as that shown in FIG. 8(b) (low-contrast patterns) can be discriminated by comparing the minimum value with the predetermined threshold value A.

Accordingly, the movement vectors detected with respect to blocks having a correlation such as that shown in FIG. 8(b) are recognized as ineffective vectors by the evaluation in accordance with the first embodiment, thereby improving the accuracy with which the movement vector of the entire image is determined.

A movement vector evaluation method in accordance with a second embodiment of the present invention will be described below.

The correlation value detection circuit 206 of the second embodiment detects the maximum of a plurality of correlation values calculated by the correlation calculation circuit 203.

Figure 9:
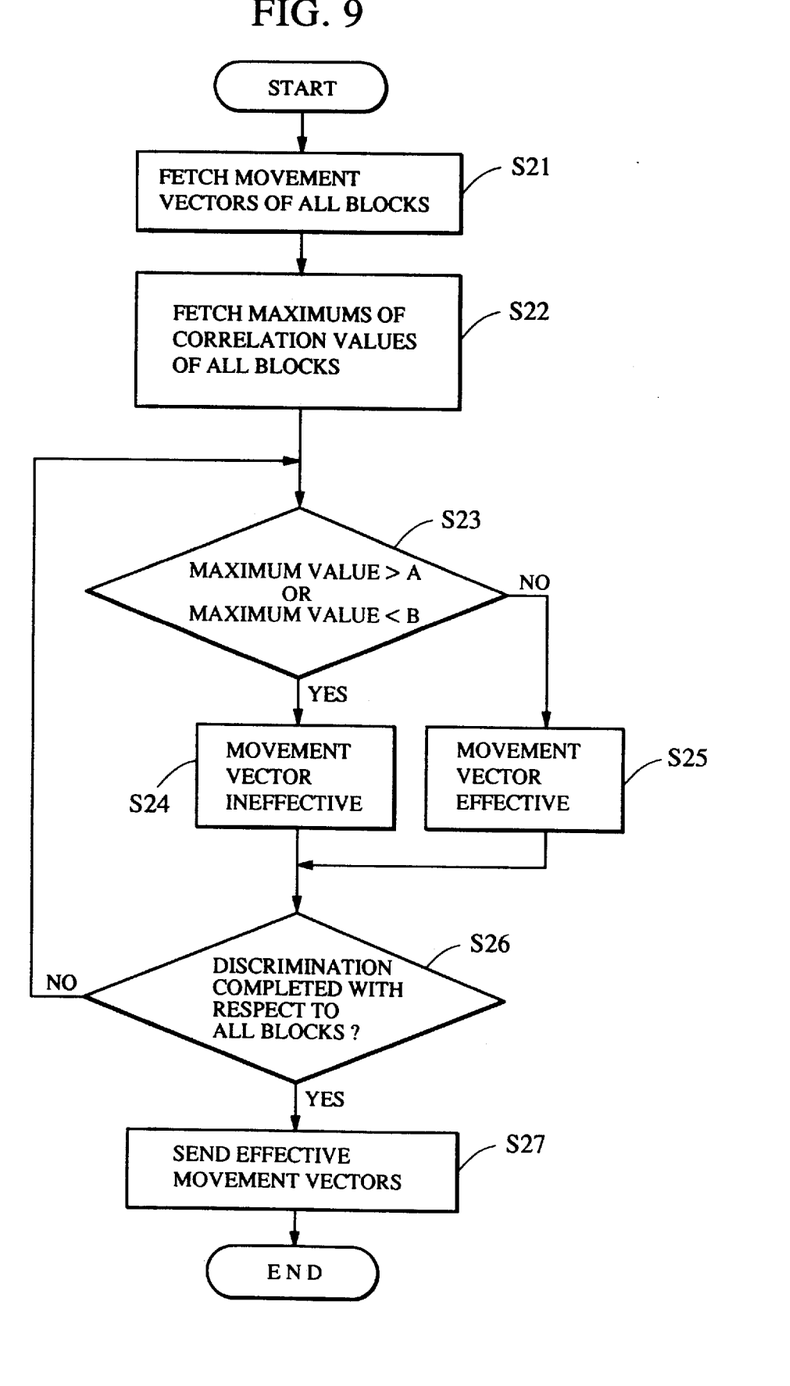
FIG. 9 is a flowchart of processing in movement vector evaluation circuit 207 in accordance with a second embodiment of the present invention.

FIG. 9 is a flowchart of the processing in the movement vector evaluation circuit 207 of the second embodiment.

First, in step S21, all the movement vectors of the blocks are received from the movement vector detection circuit 205.

In step S22, the maximum of the correlation values of each block output from the correlation value detection circuit 206 is received with respect to all the blocks.

In step S23, the maximum value of each block is compared with threshold values A and B (A>B) previously determined.

When a conditional equation:

Maximum value>A or Maximum value<B is satisfied, the process proceeds to step S24 to recognize the movement vector of the corresponding block as an ineffective vector.

When the conditional equation is not satisfied, the process proceeds to step S25 to recognize the movement vector of the corresponding block as an effective vector.

In step S26, a determination is made as to whether the discrimination has been completed with respect to all the blocks. If the discrimination has not been completed, the process returns to step S23. When the discrimination has been completed with respect to all the blocks, the process proceeds to step S27 and all the effective movement vectors discriminated with respect to the blocks in the above-described manner are output to the movement vector determination circuit 208. The movement vector evaluation processing is thereby terminated.

The effect of the evaluation method of the second embodiment will be described with reference to FIGS. 8(a) through 8(d).

The maximum of the correlation values shown in FIG. 8(b) is smaller than that of the values shown in FIG. 8(a), while the maximums of the correlation values shown in FIGS. 8(c) and 8(d) are larger than that of the values shown in FIG. 8(a).

That is, blocks having correlations such as those shown in FIGS. 8(b), 8(c) and 8(d) can be discriminated by comparing the maximum value with the predetermined threshold values A and B.

Accordingly, the movement vectors detected with respect to blocks having correlations such as those shown in FIGS.

8(b), 8(c) and 8(d) are recognized as ineffective vectors by the evaluation in accordance with the second embodiment, thereby improving the accuracy with which the movement vector of the entire image is determined.

A movement vector evaluation method in accordance with a third embodiment will be described below.

The correlation value detection circuit 206 of the third embodiment detects the minimum and the maximum of a plurality of correlation values calculated by the correlation calculation circuit 203.

Figure 10:
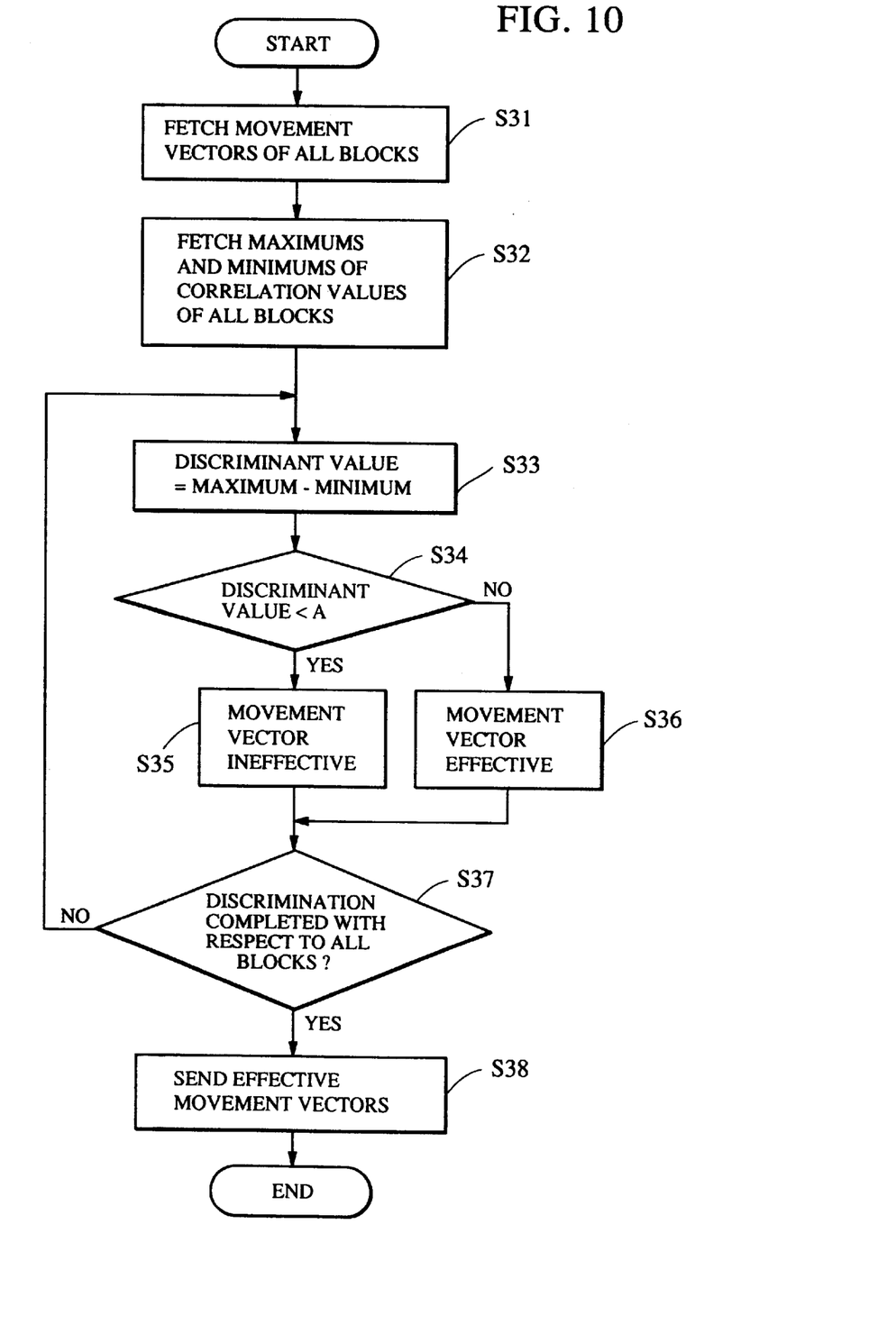
FIG. 10 is a flowchart of processing in movement vector evaluation circuit 207 in accordance with a third embodiment of the present invention.

FIG. 10 is a flowchart of the processing in the movement vector evaluation circuit 207 of the third embodiment.

First, in step S31, all the movement vectors of the blocks are received from the movement vector detection circuit 205.

In step S32, the minimum and the maximum of the correlation values of each block output from the correlation value detection circuit 206 are received with respect to all the blocks.

In step S33, a discriminant value is calculated with respect to each block by the following equation:

Discriminant value=maximum value−minimum value.

In step S34, the discriminant value is compared with a threshold value A previously determined.

When a conditional equation:

Discriminant value<A is satisfied, the process proceeds to step S35 to recognize the movement vector of the corresponding block as an ineffective vector.

When the conditional equation is not satisfied, the process proceeds to step S36 to recognize the movement vector of the corresponding block as an effective vector.

In step S37, a determination is made as to whether the discrimination has been completed with respect to all the blocks. If the discrimination has not been completed, the process returns to step S33. When the discrimination has been completed with respect to all the blocks, the process proceeds to step S38 and all the effective movement vectors discriminated with respect to the blocks in the above-described manner are output to the movement vector determination circuit 208. The movement vector evaluation processing is thereby terminated.

The effect of the evaluation method of the third embodiment will be described with reference to FIGS. 8(a) through 8(d).

The difference between the maximum and minimum values of the correlation values shown in FIG. 8(b) is smaller than that of the correlation values shown in FIG. 8(a).

That is, blocks having a correlation such as that shown in FIG. 8(b) can be discriminated by comparing the difference between the maximum and minimum values with the predetermined threshold value A.

Accordingly, the movement vectors detected with respect to blocks having a correlation such as that shown in FIG. 8(b) are recognized as ineffective vectors by the evaluation in accordance with the third embodiment, thereby improving the accuracy with which the movement vector of the entire image is determined.

A movement vector evaluation method in accordance with a fourth embodiment will be described below.

The correlation value detection circuit 206 of the fourth embodiment detects the minimum, the maximum and an average of a plurality of correlation values calculated by the correlation calculation circuit 203.

Figure 11:
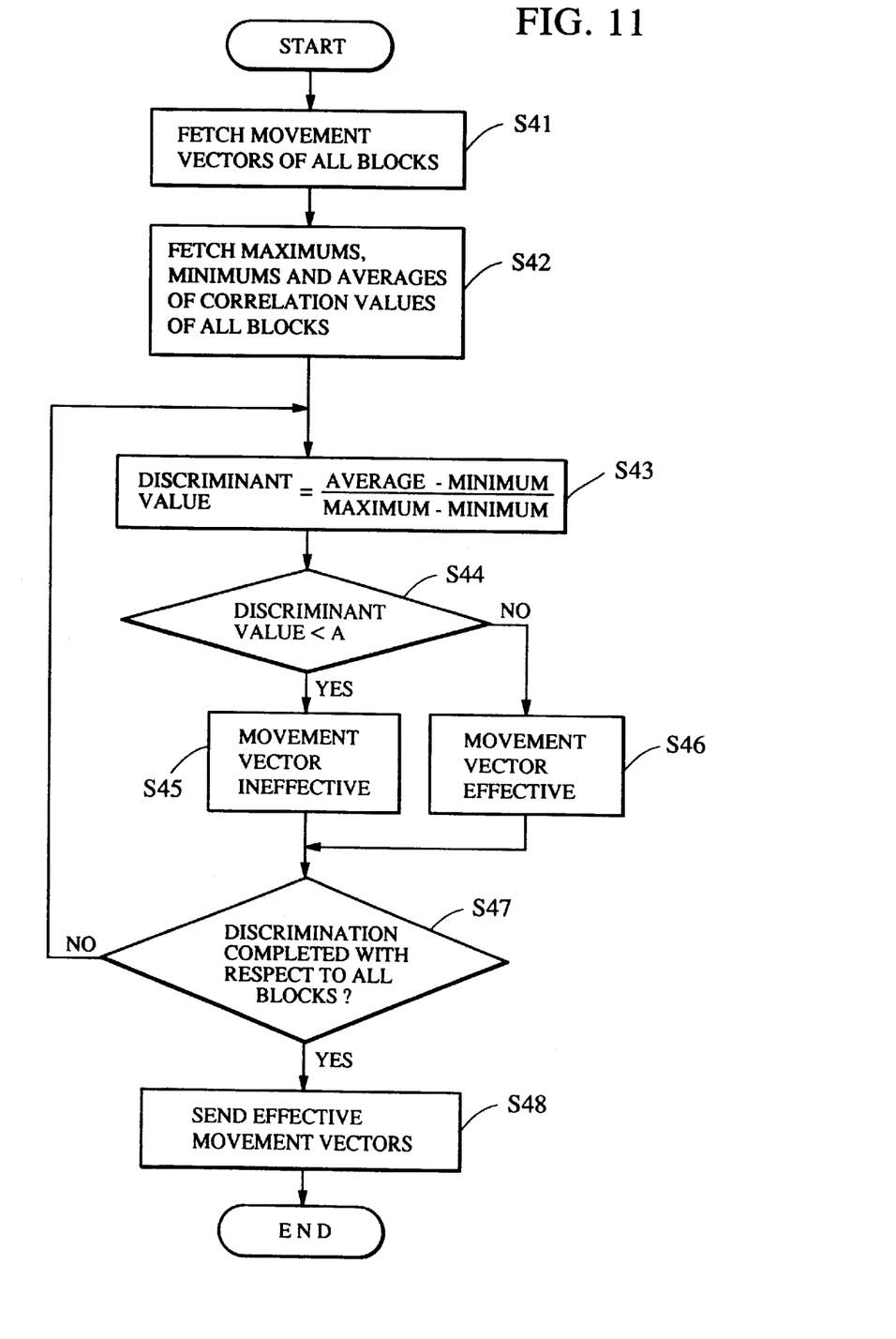
FIG. 11 is a flowchart of processing in movement vector evaluation circuit 207 in accordance with a fourth embodiment of the present invention.

FIG. 11 is a flowchart of the processing in the movement vector evaluation circuit 207 of the fourth embodiment.

First, in step S41, all the movement vectors of the blocks are received from the movement vector detection circuit 205.

In step S42, the minimum, maximum, and average of the correlation values of each block output from the correlation value detection circuit 206 are received with respect to all the blocks.

In step S43, a discriminant value is calculated with respect to each block by the following equation:

Discriminant value=(average value−minimum value)/(maximum value−minimum value).

In step S44, the discriminant value is compared with a threshold value A previously determined.

When a conditional equation:

Discriminant value<A is satisfied, the process proceeds to step S45 to recognize the movement vector of the corresponding block as an ineffective vector.

When the conditional equation is not satisfied, the process proceeds to step S46 to recognize the movement vector of the corresponding block as an effective vector.

In step S47, a determination is made as to whether the discrimination has been completed with respect to all the blocks. If the discrimination has not been completed, the process returns to step S43. When the discrimination has been completed with respect to all the blocks, the process proceeds to step S48 and all the effective movement vectors discriminated with respect to the blocks in the above-described manner are output to the movement vector determination circuit 208. The movement vector evaluation processing is thereby terminated.

The effect of the evaluation method of the fourth embodiment will be described with reference to FIGS. 8(a) through 8(d).

The ratios of the difference between the average value and the minimum value to the difference between the maximum and minimum values of the correlation values shown in each of FIGS. 8(b), 8(c) and 8(d) are smaller than that of the correlation values shown in FIG. 8(a).

That is, blocks having correlations such as those shown in FIGS. 8(b), 8(c) and 8(d) can be discriminated by comparing the ratio of the difference between the average value and the minimum value to the difference between the maximum and minimum values with the predetermined threshold value A.

Accordingly, the movement vectors detected with respect to blocks having correlations such as those shown in FIGS. 8(b), 8(c) and 8(d) are recognized as ineffective vectors by the evaluation in accordance with the fourth embodiment, thereby improving the accuracy with which the movement vector of the entire image is determined.

A fifth embodiment of the present invention will be described below.

In the fifth embodiment, the configuration of the image shaking correction circuit 113 shown in FIG. 5 is different from that in the first to fourth embodiments.

Figure 12:
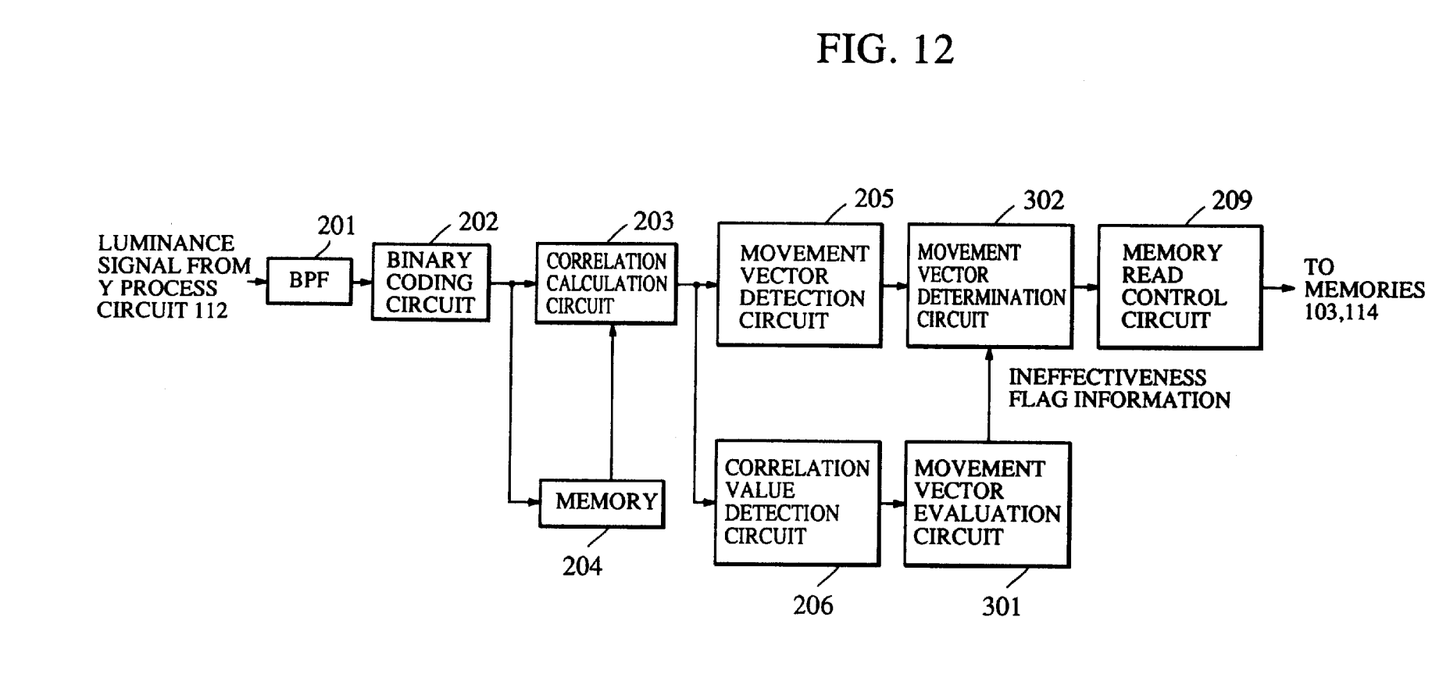
FIG. 12 is a block diagram of another example in accordance with a fifth embodiment of image shaking correction circuit 113 shown in FIG. 5.

FIG. 12 is a block diagram of the image shaking correction circuit 113 of the fifth embodiment. The same components as those shown in FIG. 6 are indicated by the same reference characters in FIG. 12, and the description for them will not be repeated.

A movement vector evaluation circuit 301 evaluates each movement vector in accordance with the corresponding correlation value detected by the correlation value detection circuit 206 (the minimum value, the maximum value, the difference between the maximum and minimum values, or the ratio of the difference between the average and minimum values to the difference between the maximum and minimum values, as in the case of the first to fourth embodiments), and outputs evaluation information (e.g., a flag) for each block to the movement vector determination circuit 302.

The movement vector determination circuit 302 determines a movement vector on the basis of the evaluation information for the blocks by using, as processing object vectors, only effective vectors among the movement vectors input from the movement vector detection circuit 205.

In other respects, the processing of this embodiment is the same as that of the first to fourth embodiments.

The individual components shown in outline or designated by blocks in the drawings are all well-known in the image processor and movement vector detection apparatus arts, and their specific constructions and operation are not critical to the operation or best mode for carrying out the invention.

The present invention can be practiced in other various forms without departing from the spirit and main features thereof.

For example, movement vector evaluation may, of course, be performed on the basis of a combination of the first to fourth embodiments, although each of the first to fourth embodiments has been described independently.

Needless to say, if movement vector evaluation is performed on the basis of a combination of the first to fourth embodiments, the accuracy with which a movement vector of an entire picture is determined can be increased in comparison with the process of each embodiment.

In addition to this, movement vector detection may, of course, be performed on the basis of correlation between a current image and a following image, although movement vector detection is performed on the basis of a correlation between the current image and a previous image.

In other words, the foregoing description of embodiments has been given for illustrative purposes only and is not to be construed as imposing any limitation in every respect.

The scope of the invention is, therefore, to be determined solely by the following claims and not limited by the text of the specification and alterations made within a scope equivalent to the scope of the claims fall within the true spirit and scope of the invention.

What is claimed is:

1. A movement vector detection apparatus comprising:

input means for inputting a digital color image signal having a luminance signal and a chrominance signal, said input means separating the digital color image signal into a luminance channel and a chrominance channel;

binary coding means for converting the luminance signal into a two-value signal by comparing each of a plurality of pixel values of the luminance signal to a predetermined value;

calculation means for calculating a correlation between the current image and a previous image by using the two-value signal output from said binary coding means;

detection means for detecting a movement vector by using correlation values calculated by said calculation means;

evaluation means for evaluating a plurality of movement vectors detected by said detection means on the basis of correlation values calculated by said calculation means;

determination means for determining a particular movement vector from the plurality of movement vectors evaluated by said evaluation means, the particular movement vector being used in the chrominance channel as a movement vector of the chrominance signal corresponding to the luminance signal;

chrominance correcting means for correcting the chrominance signal so as to correct image shake in the chrominance channel by using the particular movement vector;

luminance correcting means for correcting the luminance signal so as to correct image shake in the luminance channel, by using the particular movement vector, said luminance correcting means being independent from said chrominance correcting means; and output means for outputting the corrected chrominance signal and the corrected luminance signal, separately.

2. A movement vector detection apparatus according to claim 1, wherein said calculation means comprises means for dividing the two-value signal with respect to a plurality of blocks and means for calculating a correlation between a portion of the current image corresponding to each block and the previous image.

3. A movement vector detection apparatus according to claim 1, wherein said evaluation means evaluates the reliability of each of the movement vectors detected by said detection means on the basis of the minimum of the corresponding correlation values.

4. A movement vector detection apparatus according to claim 1, wherein said evaluation means evaluates the reliability of each of the movement vectors detected by said detection means on the basis of the maximum of the corresponding correlation values.

5. A movement vector detection apparatus according to claim 1, wherein said evaluation means evaluates the reliability of each of the movement vectors detected by said detection means on the basis of the maximum and the minimum of the corresponding correlation values.

6. A movement vector detection apparatus according to claim 1, wherein said evaluation means evaluates the reliability of each of the movement vectors detected by said detection means on the basis of the maximum, the minimum and an average of the corresponding correlation values.

7. A movement vector detection apparatus according to claim 6, wherein said evaluation means evaluates the reliability of each of the movement vectors detected by said detection means on the basis of the ratio of the difference between the average value and the minimum value to the difference between the maximum value and the minimum value.

8. A movement vector detection apparatus according to claim 1, wherein said binary coding means converts the input image signal into a two-value signal after band-pass filtering the input signal.

9. An apparatus according to claim 1, wherein said input means includes image pickup means for providing a color image signal, and converting means for converting the color image signal into a digital color image signal.

10. An image processing apparatus comprising:

input means for inputting a color image signal having a luminance signal and a chrominance signal, said input means separating the color image signal into a luminance channel and a chrominance channel;

calculation means for calculating a correlation between the current image and a previous image by using the luminance signal;

detection means for detecting a movement vector by using correlation values calculated by said calculation means;

evaluation means for evaluating a plurality of movement vectors detected by said detection means on the basis of correlation values calculated by said calculation means; and determination means for determining a particular movement vector from the plurality of movement vectors evaluated by said evaluation means, the particular movement vector being used in the chrominance channel as a movement vector of the chrominance signal corresponding to the luminance signal;

chrominance correcting means for correcting the chrominance signal so as to correct image shake in the chrominance channel by using the particular movement vector;

luminance correcting means for correcting the luminance signal so as to correct image shake in the luminance channel, by using the particular movement vector, said luminance correcting means being independent from said chrominance correcting means; and output means for outputting the corrected chrominance signal and the corrected luminance signal, separately.

11. Apparatus according to claim 10, further comprising interpolation means for interpolation the luminance signal and chrominance signal read by said reading means.

12. Apparatus according to claim 10, wherein said evaluation means evaluates the reliability of each of the movement vectors detected by said detection means on the basis of the minimum of the corresponding correlation values.

13. Apparatus according to claim 10, wherein said evaluation means evaluates a reliability of each of the movement vectors detected by said detection means on the basis of the maximum of the corresponding correlation values.

14. Apparatus according to claim 10, wherein said evaluation means evaluates a reliability of each of the movement vectors detected by said detection means of the basis of the maximum, the minimum, and an average of the corresponding correlation values.

15. Apparatus according to claim 10, wherein said calculation means includes binary coding means for converting the luminance signal into a two-value signal by comparing each of a plurality of pixel values of the luminance signal to a predetermined value, and calculates the correlation by using the two-value signal output from said binary coding means.

16. An apparatus according to claim 10, wherein said input means includes image pickup means for providing the color image signal.

* * * * *

UNITED STATES PATENT AND TRADEMARK OFFICE
CERTIFICATE OF CORRECTION

PATENT NO. : 5,905,527
DATED : May 18, 1999
INVENTOR(S) : KAZUYA INOU

It is certified that error appears in the above-indentified patent and that said Letters Patent is hereby corrected as shown below:

TITLE PAGE AT ITEM [56] OTHER PUBLICATIONS,
In "An Adaptive", "Transaction" should read
--Transactions--; and
In "Automatic", "Stabalizing" should read --Stabilizing--.

COLUMN 13,
Line 26, "interpolation" (2nd occurrence) should read
--interpolating--.

Signed and Sealed this

Twenty-third Day of November, 1999

Q. TODD DICKINSON

Attest:

Attesting Officer

Acting Commissioner of Patents and Trademarks